United States Patent
Tago (10) Patent No.: US 8,564,747 B2
(45) Date of Patent: Oct. 22, 2013

(54) LIQUID CRYSTAL DISPLAY DEVICE

(75) Inventor: Keiji Tago, Kumagaya (JP)

(73) Assignee: Japan Display Central Inc., Fukaya-Shi, Saitama (JP)

( * ) Notice: Subject to any disclaimer, the term of this patent is extended or adjusted under 35 U.S.C. 154(b) by 413 days.

(21) Appl. No.: 12/420,527

(22) Filed: Apr. 8, 2009

(65) Prior Publication Data

US 2009/0296032 A1 Dec. 3, 2009

(30) Foreign Application Priority Data

Jun. 3, 2008 (JP) ................................. 2008-145887

(51) Int. Cl.
*G02F 1/133* (2006.01)
(52) U.S. Cl.
USPC ........................................................ 349/116
(58) Field of Classification Search
USPC ........................................................ 349/116
See application file for complete search history.

(56) References Cited

U.S. PATENT DOCUMENTS

| | | | | |
|---|---|---|---|---|
| 5,446,564 A * | 8/1995 | Mawatari et al. | ............. | 349/116 |
| 2005/0146664 A1* | 7/2005 | Hanaoka et al. | ............. | 349/130 |
| 2007/0206129 A1* | 9/2007 | Nakamura et al. | ............. | 349/84 |
| 2008/0246708 A1* | 10/2008 | Ishiguro | ............. | 345/87 |
| 2008/0284720 A1* | 11/2008 | Fukutome | ............. | 345/102 |

FOREIGN PATENT DOCUMENTS

| JP | 2007-304519 | 11/2007 |
|---|---|---|
| JP | 2008-58934 | 3/2008 |
| JP | 2008-122659 | 5/2008 |
| JP | 2008-139380 | 6/2008 |

OTHER PUBLICATIONS

Official communication issued by Japan Patent Office, mailed Sep. 4, 2012 for counterpart Japan Patent Application No. 2008-145887 (2 pages).

* cited by examiner

*Primary Examiner* — Uyen Chau N Le
*Assistant Examiner* — Chris Chu
(74) *Attorney, Agent, or Firm* — Finnegan, Henderson, Farabow, Garrett & Dunner, L.L.P.

(57) ABSTRACT

A liquid crystal display device includes an array substrate formed with a number of switching elements and photosensors, a countersubstrate arranged opposite to the array substrate with a gap between the array substrate and the countersubstrate, a liquid crystal layer sandwiched between the array substrate and the countersubstrate and formed from a liquid crystal material which is negative in dielectric anisotropy, and an alignment control structure set on at least one of the array substrate and countersubstrate to control the alignment state of liquid crystal molecules in the liquid crystal layer, wherein each of the photosensors being placed opposite to the alignment control structure.

10 Claims, 8 Drawing Sheets

_(1)_
LIQUID CRYSTAL DISPLAY DEVICE

CROSS-REFERENCE TO RELATED APPLICATIONS

This application is based upon and claims the benefit of priority from prior Japanese Patent Application No. 2008-145887, filed Jun. 3, 2008, the entire contents of which are incorporated herein by reference.

BACKGROUND OF THE INVENTION

1. Field of the Invention

The present invention relates to a liquid crystal display device.

2. Description of the Related Art

Liquid crystal display devices have been used as the displays of cellular phones, smart phones, personal digital assistants (PDAs), personal computers and so on utilizing their features of being flat, lightweight, and low in power dissipation. The addition of an external input function, such as a touch sensitive screen or pen input, to the liquid crystal display devices has extended their uses besides display. To add the external input function, however, it is required to mount new components on the liquid crystal display devices. Problems therefore arise in that the thickness and weight of the display device increase and the cost increases because of the addition of new components and new assembly steps.

Heretofore, a drive circuit has been installed on the array substrate by being externally attached to it. In recent years, however, a technique has been developed which manufactures a drive circuit into the array substrate by forming thin-film transistors (TFTs) for the drive circuit on the array substrate in forming pixel switching TFTs on the array substrate. This allows the manufacturing cost, the weight and the thickness of the liquid crystal display device to be reduced.

By manufacturing a photosensor into each pixel of the array substrate utilizing the aforementioned technique, the liquid crystal display device is allowed to obtain an image read function and an input function. This technique is disclosed in Jpn. Pat. Appln. KOKAI Publication No. 2007-304519 by way of example. For example, backlight from a source placed outside the countersubstrate passes through a pair of substrates and is then directed onto a target of image reading placed outside the array substrate and reflected by that target. The photosensors can detect the intensity of the reflected light from the target. The liquid crystal display device can also obtain the input function by detecting the intensity of external light with the photosensors.

As a display mode of the liquid crystal display device, the vertical alignment (VA) mode has been in wide use. The liquid crystal layer is formed from a liquid crystal material which is negative in dielectric anisotropy. The liquid crystal display device can provide sufficient black display and increase contrast by aligning liquid crystal molecules perpendicularly to the substrate using the VA mode and setting the double refractive index of the liquid crystal layer to nearly zero.

Above all, a liquid crystal display device of multi-domain vertical alignment (MVA) mode in which the direction of inclination of liquid crystal molecules inside each pixel is divided into two or more regions with a structure is excellent in display quality (contrast and so on) and has a wide viewing-angle characteristic.

However, when a photosensor is placed inside each pixel, that area in one pixel which can be used for image display will become small. A display image in this case will become darker than one when no photosensors are placed.

With the MVA mode in which a wide viewing angle and a high contrast can be expected, one or both of the array substrate and the countersubstrate need a liquid crystal alignment control structure which is formed of dielectric projections or indium tin oxide (ITO) slits.

In the neighborhood of that structure, liquid crystal molecules little react and contribute to transmissive display, causing a problem that the display image becomes dark. When the dielectric projections are used as the liquid crystal alignment control structure, light leaks to inclined portions of the projections due to the influence of aligned liquid crystal molecules, causing a problem of low contrast ratio.

BRIEF SUMMARY OF THE INVENTION

According to an aspect of the present invention, there is provided a liquid crystal display device comprising:

an array substrate formed with a number of switching elements and photosensors;

a countersubstrate arranged opposite to the array substrate with a gap between the array substrate and the countersubstrate;

a liquid crystal layer sandwiched between the array substrate and the countersubstrate and formed from a liquid crystal material which is negative in dielectric anisotropy; and an alignment control structure set on at least one of the array substrate and countersubstrate to control the alignment state of liquid crystal molecules in the liquid crystal layer, wherein each of the photosensors being placed opposite to the alignment control structure.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A liquid crystal display device according to an embodiment of the present invention will be described hereinafter in detail with reference to the accompanying drawings.

As shown in FIGS. 1 to 9, the liquid crystal display device is equipped with a liquid crystal display panel DP, a backlight unit 7, and a controller 8. The display mode of the liquid crystal display panel DP is the MVA mode.

Figure 1:
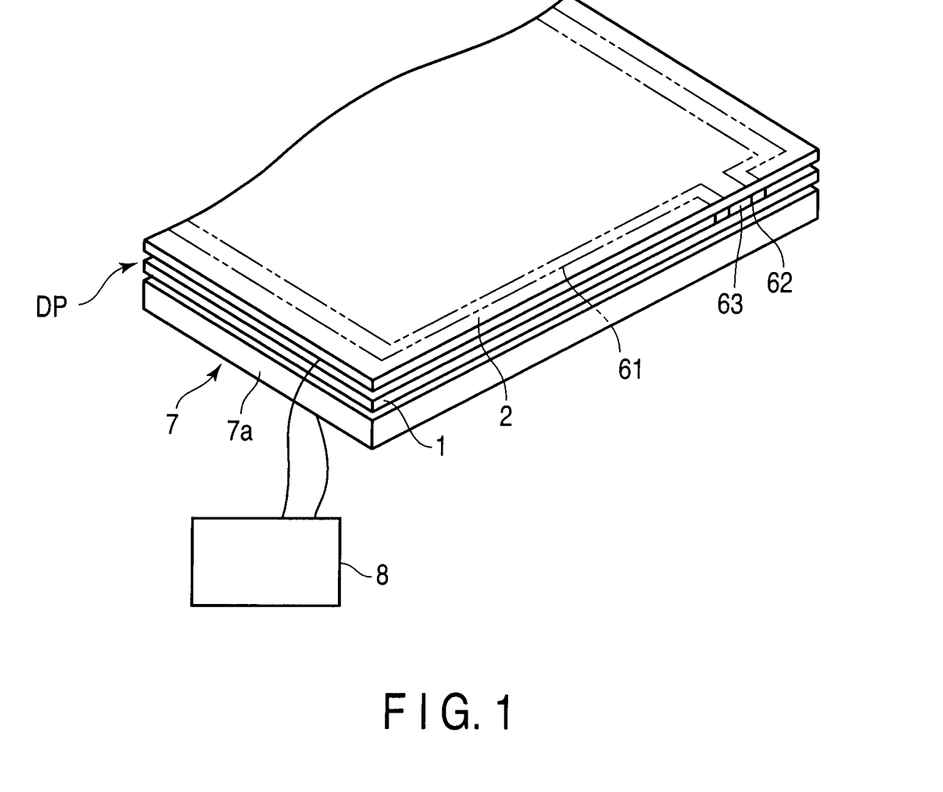
FIG. 1 is a perspective view of a liquid crystal display device according to an embodiment of the present invention.
Figure 2:
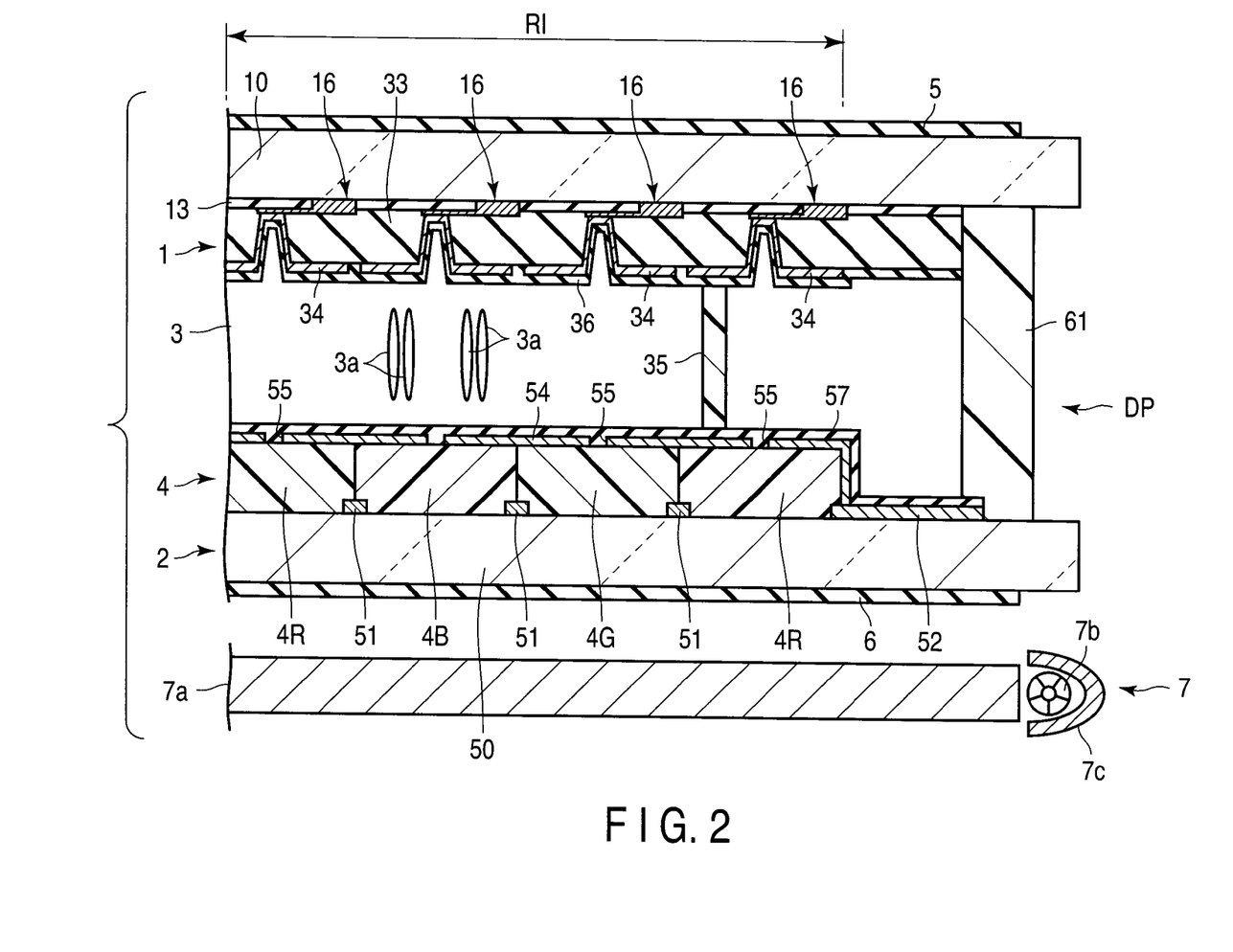
FIG. 2 is a sectional view of a portion of the liquid crystal display device shown in FIG. 1.

The liquid crystal display panel DP comprises an array substrate 1, a countersubstrate 2, a liquid crystal layer 3 sandwiched between the array substrate and countersubstrate, a color filter 4, a first polarizer 5, and a second polarizer 6. The array substrate 1 and countersubstrate 2 are arranged opposite to each other with a predetermined gap therebetween. The liquid crystal display panel DP has a rectangular display area R1. Here, the display area R1 is 2.2 inches diagonally.

The array substrate 1 has a rectangular glass substrate 10 as a first substrate. The countersubstrate 2 has a rectangular glass substrate 50 as a second substrate. The first and second substrates are not limited to glass substrates and are merely required to be transparent insulating substrates. Here, the glass substrates 10 and 50 have a thickness of 0.7 mm.

Figure 3:
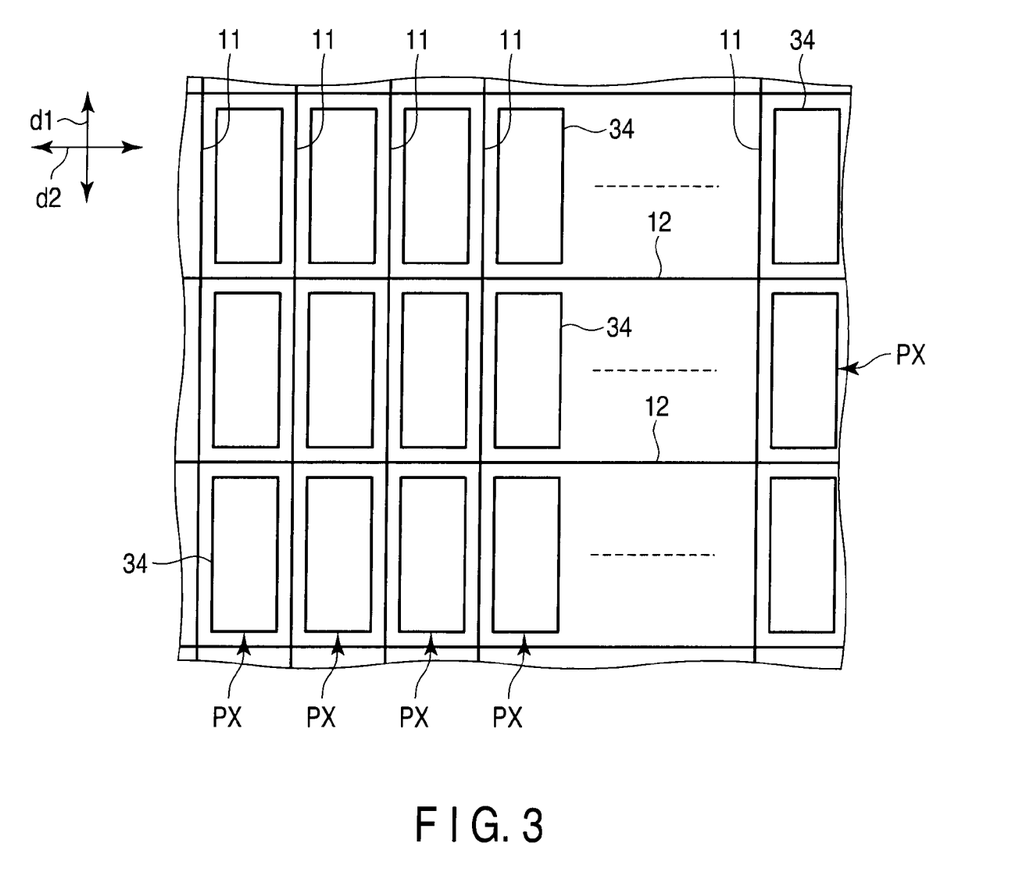
FIG. 3 is a schematic diagram of a portion of the array substrate shown in FIGS. 1 and 2.

In the display area R1, the array substrate 1 has a number of pixels PX formed in a matrix form on the glass substrate 10. Here, the pixels PX are arranged in the form of a matrix of (320×3)×240.

Figure 4:
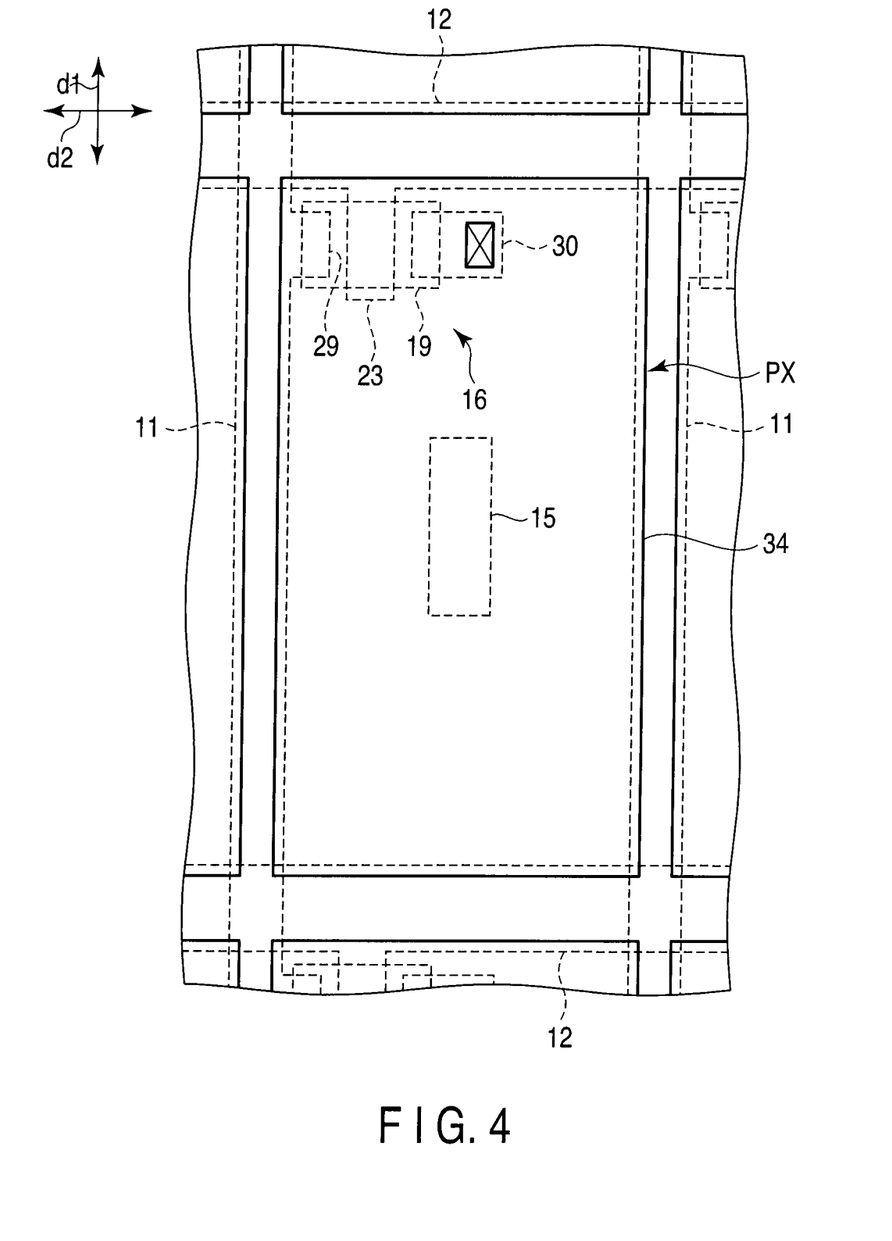
FIG. 4 is a schematic plan view illustrating a photosensor and a wiring structure of the liquid crystal display panel shown in FIGS. 1 and 2.

In the array substrate 1, the glass substrate 10 is formed on top with a number of signal lines 11 and a number of scanning lines 12 which are arranged in a grid form. The signal lines 11 extend in a first direction d1 and are equally spaced in a second direction d2 perpendicular to the first direction. The scanning lines 12 extend in the second direction d2 and are equally spaced in the first direction d1 to intersect the signal lines. Each of the pixels PX corresponds to the area surrounded by two adjacent signal lines 11 and two adjacent scanning lines 12.

The signal lines 11, the scanning lines 12, a number of photosensors 15, a number of thin-film transistors (TFTs) as switching elements, and TFTs 17 for the drive circuit are arranged on the glass substrate 10. Each of the photosensors 15 is placed opposite to a respective one of the pixels PX. Each of the TFTs 16 is set in the vicinity of a respective one of the intersections of the signal and scanning lines. The TFTs 17 are formed outside the display area R1 to constitute the drive circuit not shown. The photosensors 15, the TFTs 16 and the TFTs 17 will be described later.

Figure 6:
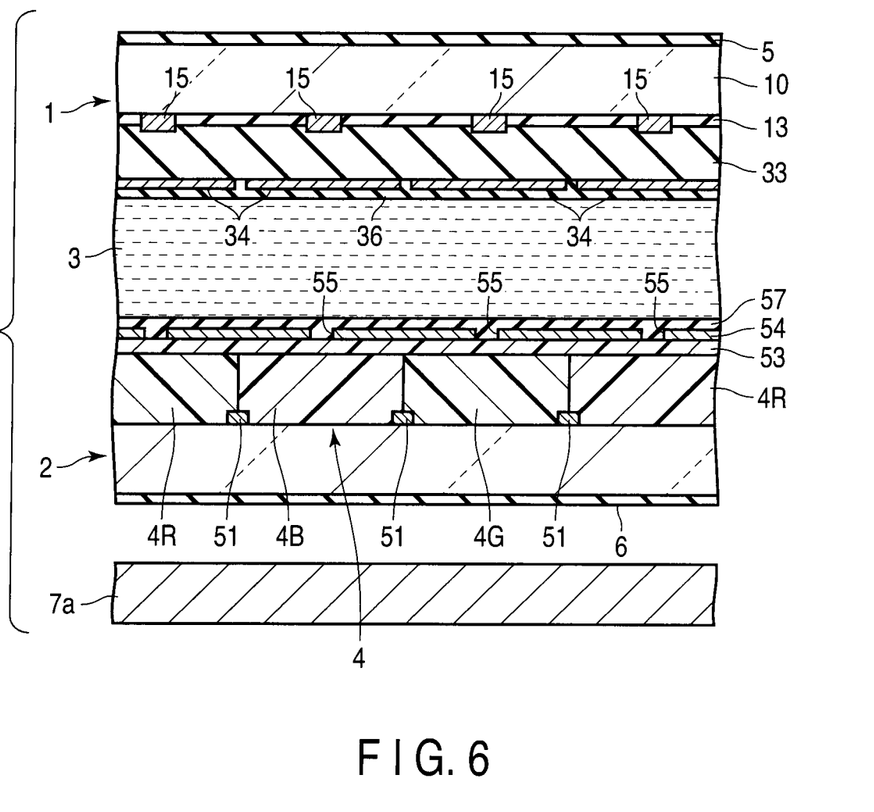
FIG. 6 is a sectional view of the liquid crystal display device along line VI-VI of FIG. 5.

The insulating layer 13 is formed on the glass substrate 10. A passivation film 33 is formed over the glass substrate 10, the signal lines 11, the scanning lines 12, the insulating layer 13, the photosensors 15, and the TFTs 16 and 17. In the display area R1, the pixel electrode 34 is formed on the passivation film 33 in matrix. The pixel electrodes 34 are formed of a transparent conducting material, such as indium tin oxide (ITO). Each of the pixel electrodes 34 is electrically connected with the drain electrode 30 of a corresponding one of the TFTs 16 through a contact hole formed in the passivation film 33. The pixel electrodes 34 have a one-to-one correspondence with the pixels PX.

Columnar spacers 35 as spacers are formed on the pixel electrode 34. The spacer is not limited to a columnar spacer but may be another spacer, such as a ball-like spacer. An alignment film 36 is formed on the passivation film 33 and the pixel electrode 34. Here, the alignment film 36 is a vertical alignment film.

In the countersubstrate 2, a grid-shaped first light-shield member 51 and a rectangular frame-shaped second light-shield member 52 are provided on the glass substrate 50. The first light-shield member 51 is formed to surround each of the pixels PX. The second light-shield member 52 is formed to surround the display area R1. The first and second light-shield members 51 and 52 serve as a black matrix.

Figure 5:
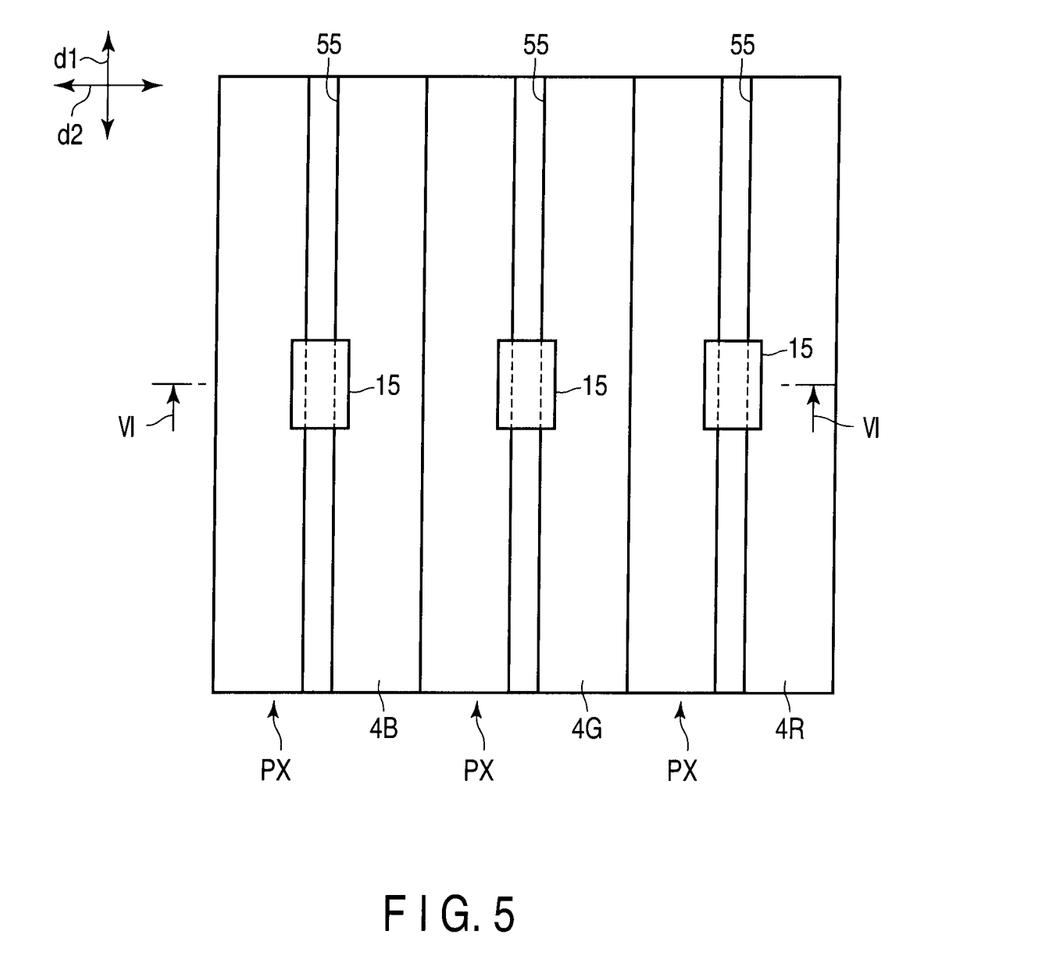
FIG. 5 is a schematic enlarged plan view of a portion of the liquid crystal display panel particularly showing photosensors, slits, and colored layers.

A color filter 4 is arranged on the glass substrate 50. The color filter 4 has red layers 4R, green layers 4G, and blue layers 4B. Each of the colored layers 4R, 4G and 4B is formed as a stripe. These layers 4R, 4G and 4B extend in the first direction d1 and are arranged adjacent to one another in the second direction d2. Each of the colored layers 4R, 4G and 4B overlaps at its peripheral portions with the first light-shield member 51.

An overcoat film 53 is formed on the color filter 4. The overcoat film 53 is formed of a transparent resin and adapted to suppress the outflow of ionic impurities from the color filter 4 to the liquid crystal layer 3.

A counterelectrode (common electrode) 54 is formed on the overcoat film 53. The counterelectrode 54 is formed of a transparent conductive material, such as ITO. The counterelectrode 54 has a number of slits 55 formed by scraping its portions in the form of slits. The slits 55 are each formed as a stripe and extend in the first direction d1. Each of the slits is positioned over corresponding pixels PX arranged in the first direction to divide each of the pixels into two equal parts in the second direction d2. Each of the photosensors 15 is arranged to lie right above a respective one of the slits 55.

An alignment control structure is formed from the slits 55 and gaps between adjacent pixel electrodes 34. The slits 55 and the gaps serve to control the alignment state of liquid crystal molecules in the liquid crystal layer 3. An alignment film 57 is formed on the overcoat film 53 and the counterelectrode 54. Here, the alignment film 57 is a vertical alignment film.

The array substrate 1 and the countersubstrate 2 are arranged opposite to each other with a predetermined gap therebetween by the columnar spacers 35. Here, the gap between the array substrate 1 and the countersubstrate 2 is set to 3.5 μm. The array substrate 1 and the countersubstrate 2 are joined together by a sealing member 61 set on the peripheral portions of both substrates.

The liquid crystal layer 3 is held between the array substrate 1 and the countersubstrate 2. A liquid crystal inlet 62 is formed in a portion of the sealing member 61. The inlet is sealed with a sealant 63. The liquid crystal layer 3 is formed of a liquid crystal material which is negative in dielectric anisotropy. The liquid crystal layer 3 is of vertical alignment type such that the liquid crystal molecules 3a are aligned vertically.

The first polarizer 5 is set on the external surface of the glass substrate 10. The second polarizer 6 is set on the external surface of the glass substrate 50.

The backlight unit 7 is located outside and opposite the second polarizer 6. The backlight unit 7 includes a light guiding plate 7a, a light source 7b and a reflector 7c. The light source 7b and the reflector 7c are placed opposed to one side edge of the light guiding plate 7a. The backlight unit 7 emits light toward the second polarizer 6.

The controller 8 is electrically connected to the liquid crystal display panel DP and the backlight unit 7 to apply drive voltages to them. In applying drive voltages to the liquid crystal display panel DP, the controller 8 applies drive voltages to the signal lines 11 and the scanning lines 12 to thereby apply drive voltages to the TFTs 16.

Furthermore, the controller 8 is connected to the photosensors 15. For this reason, the controller can obtain information captured by the photosensors. The controller can also drive the liquid crystal display panel DP on the basis of information thus obtained to display images based on the information on the liquid crystal display panel.

Figure 10:
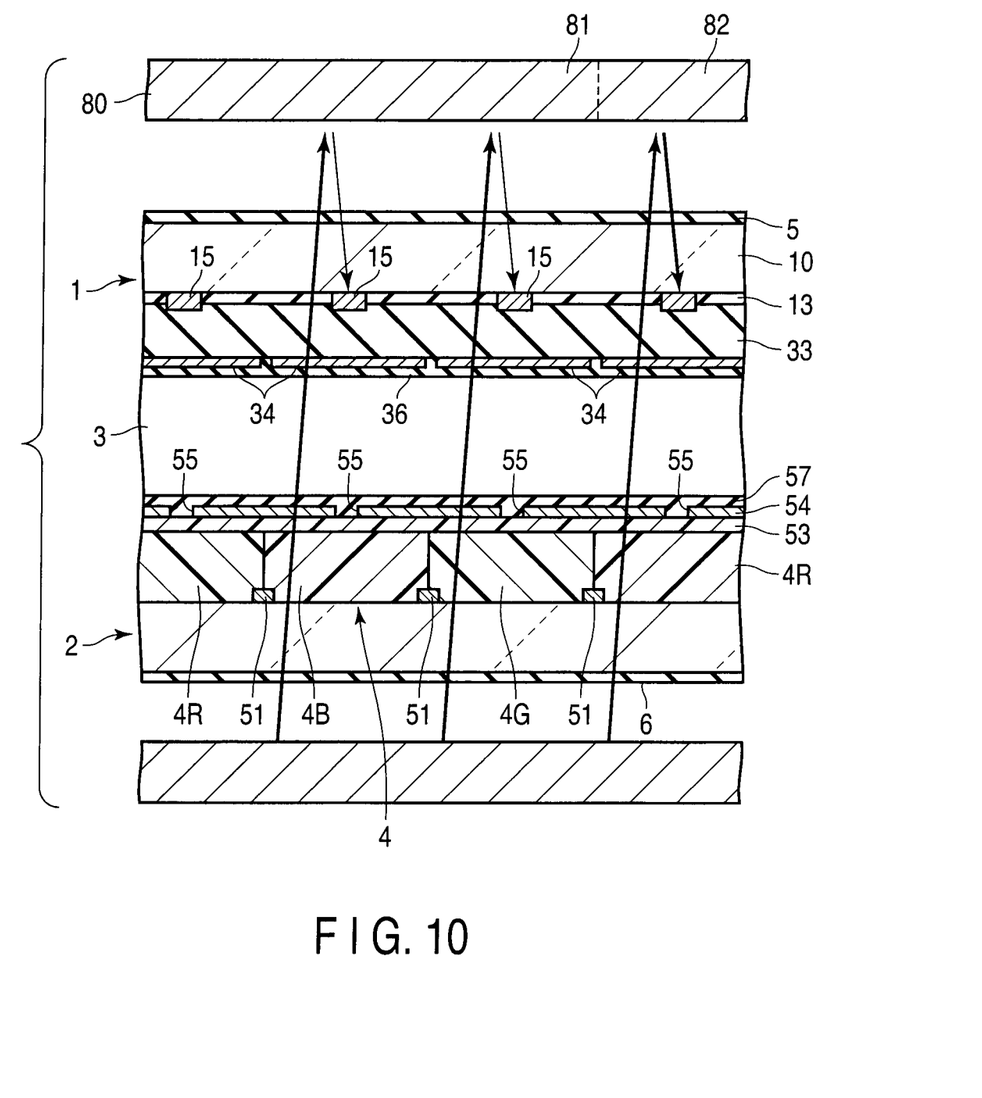
FIG. 10 shows the state in which an image on a target of image reading is read using the photosensors of the liquid crystal display device.

The use of the photosensors 15 enables the liquid crystal display device to read an image on a target 80 of image reading placed outside the array substrate 1 as shown in FIG. 10 by way of example. The photosensors 15 receive light reflected by the target 80. The liquid crystal display device reads the image by utilizing the fact that reflected light from a non-printed portion 82 (white portion) of the target 80 is larger in intensity than that from a printed portion 81 (black portion).

In addition, the liquid crystal display device can also detect the intensity of external light. For this reason, the liquid crystal display device can control the brightness level of images displayed on the display panel DP according to the intensity of external light.

According to the liquid crystal display device configured as described above, the display mode of the display panel DP is the MVA mode. Thereby, a liquid crystal display device can be provided which is high in contrast, excellent in display quality, and wide in viewing angle.

Furthermore, the liquid crystal display panel DP is formed with the photosensors 15, thereby allowing the liquid crystal display device to have a light detection function. With the liquid crystal display device of this embodiment, each of the photosensors is arranged to lie right above a respective one of the slits 55.

The photosensors 15 block light. Therefore, the liquid crystal display device formed with the photosensors becomes darker than a liquid crystal display device without photosensors. In addition, liquid crystal molecules 3a move little at and in the vicinities of the slits 55, making portions of the display panel which correspond to the slits and the vicinities thereof dark. For this reason, with a liquid crystal display device in which the photosensor 15 and the slit 55 are not opposed to each other in the area of each pixel PX, the display panel tends to become dark.

With the liquid crystal display device of this embodiment, placing in the area of each pixel PX the slit 55 which is a portion that becomes dark and the photosensor 15 that is a light-shield portion one right above the other allows reduction of the transmissive display area of the pixel to be suppressed even if the photosensor is set in the pixel.

In addition, the formation of the recessed portions (slits) in the counterelectrode 54 (ITO) in the vicinities of the photosensors 15 allows irregular reflection of light to be suppressed and the occurrence of malfunctions of the photosensors to be suppressed.

Thus, a liquid crystal display device can be obtained which has the light detection function and is excellent in display quality.

Figure 7:
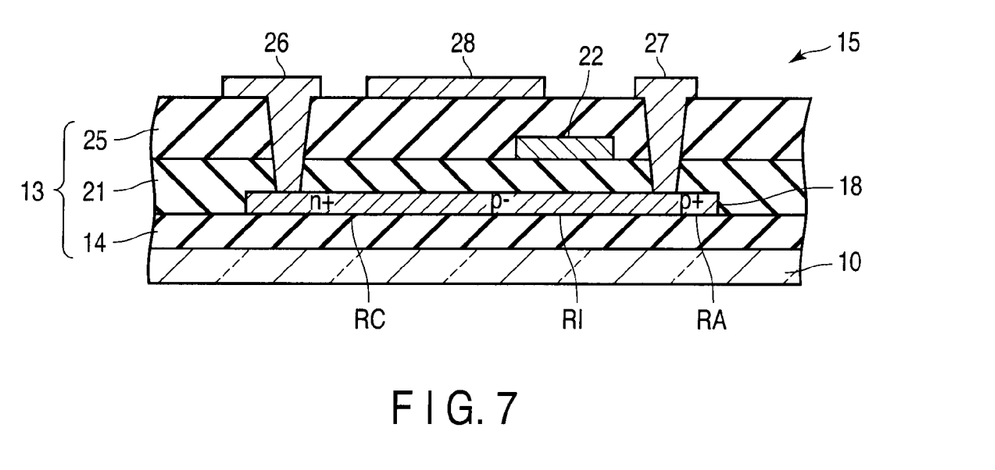
FIG. 7 is a sectional view of a photosensor formed on the array substrate.
Figure 8:
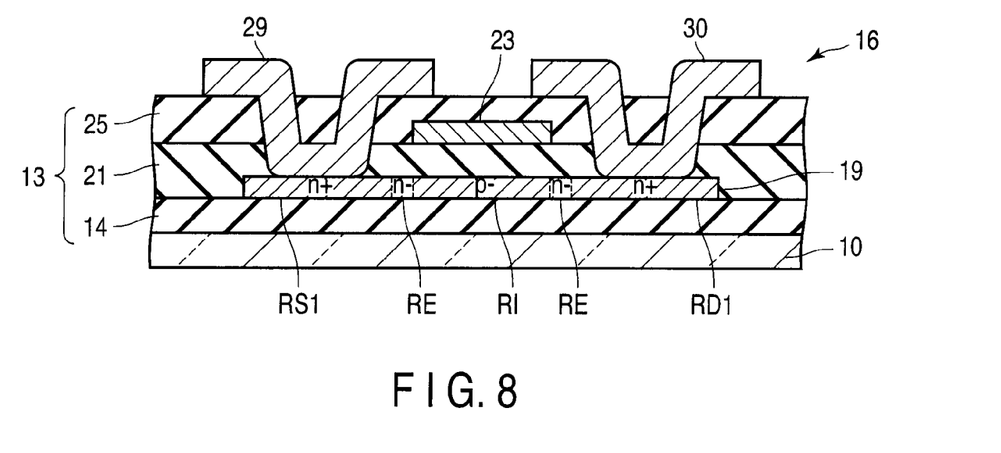
FIG. 8 is a sectional view of a thin-film transistor (TFT) for a pixel formed on the array substrate.
Figure 9:
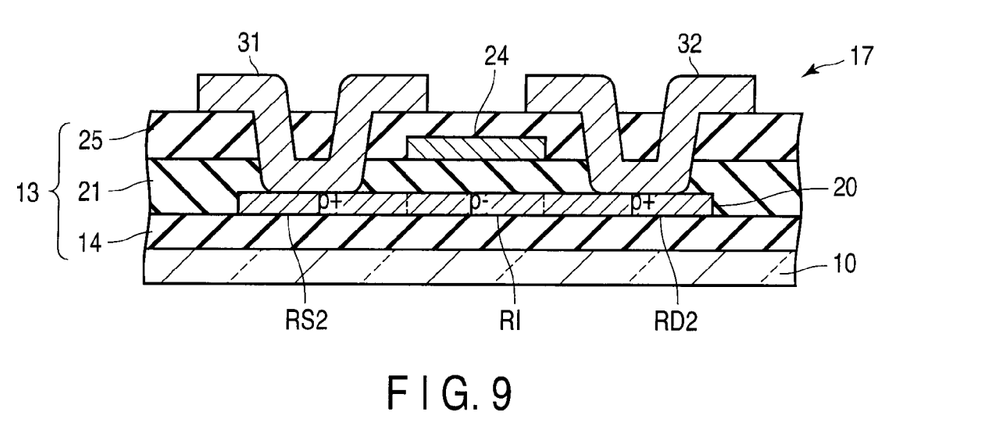
FIG. 9 is a sectional view of a TFT for the drive circuit formed on the array substrate.

The structures of the photosensors 15 and the TFTs 16 and 17 will be described below in detail.

The structure of the photosensors 15 will be described first.

As shown in FIG. 7, the photosensor 15 is formed from a lateral PIN photodiode. The photosensor 15 has a first electrode 26 for output, a second electrode 27 for output, and a semiconductor layer 18. The semiconductor layer 18 is formed on an undercoat film 14. The undercoat film 14 is formed on the glass substrate 10. The undercoat film 14 is formed of an insulating material. The undercoat film 14 serves to prevent the diffusion of impurities into devices formed over the surface of the glass substrate.

The semiconductor layer 18 is formed from polysilicon and has an n-type lightly doped cathode region RC, a p-type heavily doped anode region RA, and a lightly doped intrinsic base region RI (hereinafter referred to as the I-region RI) which is lower in doping concentration than the anode region RA. The cathode region RC, the anode region RA and the I-region RI are $n^+$, $p^+$, and $p^-$ regions, respectively.

A first insulating film 21 and a second insulating film 25 are formed in this order on the undercoat film 14 and the semiconductor layer 18. A first electrode 26 is formed on the second insulating film 25 and electrically connected to the cathode region RC of the semiconductor layer 18. The second electrode 27 is formed on the second insulating film 25 and electrically connected to the anode region RA of the semiconductor layer 18.

The semiconductor layer 18 can be formed from either of amorphous silicon and polysilicon. However, in forming the semiconductor layer 18 in the same manufacturing process as the TFTs 16 and 17, it is formed from the same material as the semiconductor layers of the TFTs The photosensor 15 is adapted to output a current corresponding to the amount of light incident on the I-region RI utilizing the semiconductor leakage current characteristic of the I-region RI. In the area which lies above the I-region RI, first and second light-shield layers 22 and 28 are formed on the first and second insulating films 21 and 25, respectively. The first and second light-shield layers 22 and 28 block backlight, thus preventing backlight from directly falling on the I-region RI.

The TFT 16 will be described next.

As shown in FIG. 8, the TFT 16 is of n-channel type and has a semiconductor layer 19, a gate electrode 23, a source electrode 29, and a drain electrode 30.

The semiconductor layer 19 consists of polysilicon and is formed on the undercoat 14. The semiconductor layer 19 has a source region RS1, a drain region RD1, an I-region RI positioned between the source and drain regions, and extension regions RE located between the source and I-regions and between the drain and I-regions. The source region RS1 and the drain region RD1 are each an $n^+$ region. The I-region RI is a $p^-$ region. The extension regions RE are each an $n^-$ region.

The gate electrode 23 is formed on the first insulating layer 21. The gate electrode 23 is located right above the I-region RI of the semiconductor layer 19. The source electrode 29 is formed on the second insulating film 25 and electrically connected to the source region RS1 of the semiconductor layer 19. The drain electrode 30 is formed on the second insulating film 25 and electrically connected to the drain region RD1 of the semiconductor layer 19.

Next, the TFT 17 will be described.

As shown in FIG. 9, the TFT 17 is of p-channel type and has a semiconductor layer 20, a gate electrode 24, a source electrode 31, and a drain electrode 32.

The semiconductor layer 20 consists of polysilicon and is formed on the undercoat film 14. The semiconductor layer has a source region RS2, a drain region RD2, and an I-region RI positioned between the source and drain regions. The source region RS2 and the drain region RD2 are each a $p^+$ region. The I-region RI is a $p^-$ region.

The gate electrode 24 is formed on the first insulating layer 21. The gate electrode 24 is located right above the I-region RI of the semiconductor layer 20. The source electrode 31 is formed on the second insulating film 25 and electrically connected to the source region RS2 of the semiconductor layer 20. The drain electrode 32 is formed on the second insulating film 25 and electrically connected to the drain region RD2 of the semiconductor layer 20.

The methods of manufacturing the photosensor 15 and the TFTs 16 and 17 constructed as described above will be described below in detail.

As shown in FIGS. 7, 8 and 9, the glass substrate 10 is prepared first. Then, the undercoat film 14 consisting of $SiN_X$ or $SiO_X$ is formed on the surface of the glass substrate 10 by means of chemical vapor deposition (CVD). Next, amorphous silicon is deposited onto the undercoat film 14 at a thickness of the order of 50 Å by plasma-enhanced CVD (PECVD) or sputtering. Next, laser light is directed onto the amorphous silicon film to anneal it. Thereby, the amorphous silicon film is recrystallized to form a film of polysilicon.

After that, the polysilicon film is patterned by using photolithographic techniques to form the semiconductor layer 18, the semiconductor layer 19, and the semiconductor layer 20. Subsequently, each of the semiconductor layers 18, 19 and 20 is subjected in its entirety to ion doping of boron at a low concentration to form a $p^-$ region in it. Next, the first insulating film 21 consisting of $SiO_X$ is formed on the undercoat film 14, the semiconductor layers 18, 19 and 20 by means of PECVD or electron cyclotron resonance chemical vapor deposition (ECR-CVD).

Next, using a resist as a mask, each of the semiconductor layers 18 and 19 is highly ion doped with phosphorous to form the $n^+$ region. Thereby, the cathode region RC, which is an $n^+$ region, is formed in the semiconductor layer 18. The source region RS1 and the drain region RD1, which are also $n^+$ regions, are formed in the semiconductor layer 19.

After that, a film of metal, such as Mo—Ta or Mo—W, is deposited onto the first insulating film 21 and then patterned. Using the patterned film of metal as a mask, each of the semiconductor layers 18 and 20 is highly ion implanted with boron to form the $p^+$ region. Thereby, the anode region RA, which is a $p^+$ region, is formed in the semiconductor layer 18. The source region RS2 and the drain region RD2, which are $p^+$ regions, are formed in the semiconductor region 20. The metal layer located over the semiconductor layer 20 forms the gate electrode 24.

Subsequently, a resist mask is formed so as to overlie the semiconductor layer 18 and then the metal layer located over the semiconductor layer 19 is patterned. The semiconductor layer 19 is then lightly ion doped with phosphorus to form $n^-$ regions. Thereby, the extension regions RE, which are $n^-$ regions, are formed in the semiconductor layer 19. At this point, the metal layer located over the semiconductor layer 18 forms the first light-shield layer 22 and the metal layer located over the semiconductor layer 19 forms the gate electrode 23. Then, the resist mask formed to overlie the semiconductor layer 18 is removed.

After that, in order to activate the impurities introduced into the semiconductor layers 18, 19 and 20, the glass substrate 10 is annealed at about 500° C. and then subjected to hydrogen plasma for hydrogenation.

Subsequent to the hydrogenation, the second insulating film 25 consisting of $SiO_X$ is formed on the first insulating film 21, the first light-shield layer 22, and the gate electrodes 23 and 24 in the same CVD equipment. Thereby, an insulating layer 13 consisting of the undercoat film 14 and the first and second insulating films 21 and 25 is formed on the glass substrate 10.

Then, contact holes are formed in the first and second insulating films 21 and 25. After that, a film of metal is deposited onto the second insulating film 25 and then patterned. Thereby, the first electrode 26, the second electrode 27, the second light-shield layer 28, the source electrode 29, the drain electrode 30, the source electrode 31 and the drain electrode 32 are formed on the second insulating film 25.

By repeating the deposition and patterning as described above, the photosensors 15 and the TFTs 16 and 17 are formed. After the formation of the photosensors 15 and the TFTs 15 and 16, a passivation film 33 consisting of SiNx is formed on the surface of the second insulating film 25.

The present invention is not limited to the above-stated embodiment as it is but can be modified in various forms without departing from the scope of the invention. Proper combinations of constituents disclosed in the embodiment allows allow various inventions to be formed. For example, some constituents may be removed from all the constituents shown in the embodiment.

Although the alignment control structure is formed from the gaps formed in the pixel electrodes 34 and the recessed portions (slits 55) formed in the counterelectrode 54 opposed to the pixel electrodes, this is not restrictive. Either of the gaps in the pixel electrodes 34 and the slits in the counterelectrode 54 or both may be replaced with projections. When the projections are formed on the countersubstrate side, it is only required that they be formed on the counterelectrode 34 to project out to the array substrate side. When the projections are formed on the array substrate side, they are required to project out to the countersubstrate side.

When the projections are formed, alignment defects occur in the liquid crystal molecules 3a in the regions lying opposite to the projections, causing problems that light leaks and the contrast ratio decreases. However, the photosensors 15 opposed to the projections have a function of blocking light. For this reason, when the alignment control structure is formed from projections, the photosensors can suppress the reduction of the contrast ratio. The photosensors 15 are only required to lie opposite to the slits (recesses) or the projections that form part of the alignment control structure, thereby allowing the aforementioned advantages to be obtained.

The photosensor 15 need not be set within the area of each pixel PX. For example, the photosensors may be set within the areas of pixels PX provided with colored layers 4R or colored layers 4B. When the photosensors 15 are set opposite to the colored layers 4R or 4B, light leakage can be made less conspicuous than when the photosensors are set opposite to colored layers 4G.

The color filter 4 may be set not only on the countersubstrate 2 side but on the array substrate 1 side. The color filter should be set on at least one of the array substrate 1 and the countersubstrate 2.

The area of each pixel PX which is associated with a photosensor may be set larger than that of each pixel which is not associated with a photosensor. Thereby, the transmissive display area of each pixel PX which is opposed to a photosensor can be made comparable in size to that of each pixel which is not associated with a photosensor.

The present invention can be applied not only liquid crystal display devices of MVA mode but also to liquid crystal display devices of VA mode to obtain the aforesaid advantages.

What is claimed is:

1. A liquid crystal display device comprising:
an array substrate including a plurality of switching elements, pixel electrodes electronically connected to a respective one of the switching elements, and photosensors;
a counter-substrate arranged opposite to the array substrate with a gap between the array substrate and the counter-substrate, the counter-substrate having at least one counter-electrode opposed to the pixel electrodes;

a liquid crystal layer sandwiched between the array substrate and the counter-substrate and formed from a liquid crystal material which is negative in dielectric anisotropy; and an alignment control structure defined by gaps between the pixel electrodes of the array substrate and stripe-shaped slits in the at least one counter-electrode of the counter-substrate to control an alignment state of liquid crystal molecules in the liquid crystal layer, each of the photosensors being arranged to lie above and overlap a respective one of the slits, a width of each of the photosensors being greater than a with of the respective one of the slits, and a length of each of the photosensors being smaller than a length of the respective one of the slits.

2. The liquid crystal display device according to claim 1, further comprising:

a color filter which is on one of the array substrate or the counter-substrate and has red layers, green layers, and blue layers, wherein the photosensors are positioned so as to overlap the red layers or the blue layers.

3. The liquid crystal display device according to claim 1, wherein the array substrate has a number of pixels, and an area of a first one of the pixels which contains one of the photosensors is larger than a second one of the pixels which contains no photosensor.

4. The liquid crystal display device according to claim 1, further comprising a lighting device, wherein the lighting device is positioned closer to the counter-substrate than to the array substrate.

5. The liquid crystal display device according to claim 1, further comprising:

a color filter which is on one of the array substrate or the counter-substrate and has red layers, green layers, and blue layers, wherein the photosensors are positioned so as to not overlap the green layers.

6. A liquid crystal display device comprising:

an array substrate including a plurality of switching elements and photosensors;

a counter-substrate arranged opposite to the array substrate with a gap between the array substrate and the counter-substrate;

a liquid crystal layer sandwiched between the array substrate and the counter-substrate and formed from a liquid crystal material which is negative in dielectric anisotropy;

stripe-shaped projections on one of the array substrate or the counter-substrate to control an alignment state of liquid crystal molecules in the liquid crystal layer, the projections projecting to a side of the other one of the array substrate or the counter-substrate, the photosensors partially overlapping at least one of the projections, a width of one of the photosensors being greater than a width of the at least one of the projections, and a length of one of the photosensors being smaller than a length of the at least one of the projections.

7. The liquid crystal display device according to claim 6, further comprising:

a color filter which is on one of the array substrate or the counter-substrate and has red layers, green layers, and blue layers, wherein the photosensors are positioned so as to overlap the red layers or the blue layers.

8. The liquid crystal display device according to claim 6, wherein:

the array substrate has a plurality of pixels, and an area of a first one of the pixels which contains one of the photosensors is larger than a second one of the pixels which contains no photosensor.

9. The liquid crystal display device according to claim 6, further comprising a lighting device, wherein the lighting device is positioned closer to the counter-substrate than to the array substrate.

10. The liquid crystal display device according to claim 6, further comprising:

a color filter which is on one of the array substrate or the counter-substrate and has red layers, green layers, and blue layers, wherein the photosensors are positioned so as to not overlap the green layers.

* * * * *